United States Patent [19]

Cohen

[11] Patent Number: 4,555,334

[45] Date of Patent: Nov. 26, 1985

[54] METHOD AND APPARATUS FOR CLEANING A PURGIBLE SWIMMING POOL STRAINER

[75] Inventor: Joseph D. Cohen, Frisco, Tex.

[73] Assignee: Performance Pool Products, Ltd., Frisco, Tex.

[21] Appl. No.: 516,456

[22] Filed: Jul. 22, 1983

Related U.S. Application Data

[63] Continuation-in-part of Ser. No. 477,378, Mar. 21, 1983.

[51] Int. Cl.⁴ .............................................. B01D 29/38
[52] U.S. Cl. .................................. 210/169; 210/416.2; 210/425
[58] Field of Search ............. 210/169, 425, 426, 416.2

[56] References Cited

U.S. PATENT DOCUMENTS

| | | | |
|---|---|---|---|
| 1,216,547 | 2/1917 | Collin | 210/426 |
| 3,195,726 | 7/1965 | Saurenman et al. | 210/425 |
| 3,365,064 | 1/1968 | Horan, Jr. | 210/425 X |
| 4,153,552 | 5/1979 | Muther | 210/425 |

FOREIGN PATENT DOCUMENTS

2009978  9/1971  Fed. Rep. of Germany ...... 210/425

Primary Examiner—John Adee
Attorney, Agent, or Firm—Hubbard, Thurman, Turner & Tucker

[57] ABSTRACT

An apparatus for circulating water in a swimming pool including a strainer that is connected to a swimming pool unfiltered intake with a pump connected to the strainer for pumping water from the strainer to a filter. The filter in turn is connected to the swimming pool filtered return for depositing the filtered water into the swimming pool. The invention includes a valve connected to the pump strainer and filter for temporarily altering a flow of water from the swimming pool unfiltered intake or the filtered return to the pump and back through the strainer in a manner to provide a flow of water across the surface of the strainer to remove debris contained upon the strainer surface. A method for cleaning the residue collected by a strainer in a swimming pool water circulation system is also included that includes altering the flow of water from a swimming pool unfiltered intake to a pump and through the strainer in a manner to remove particles collected on the surface of the strainer. The altered flow of water containing the particles from the strainer is then directed to waste.

9 Claims, 3 Drawing Figures

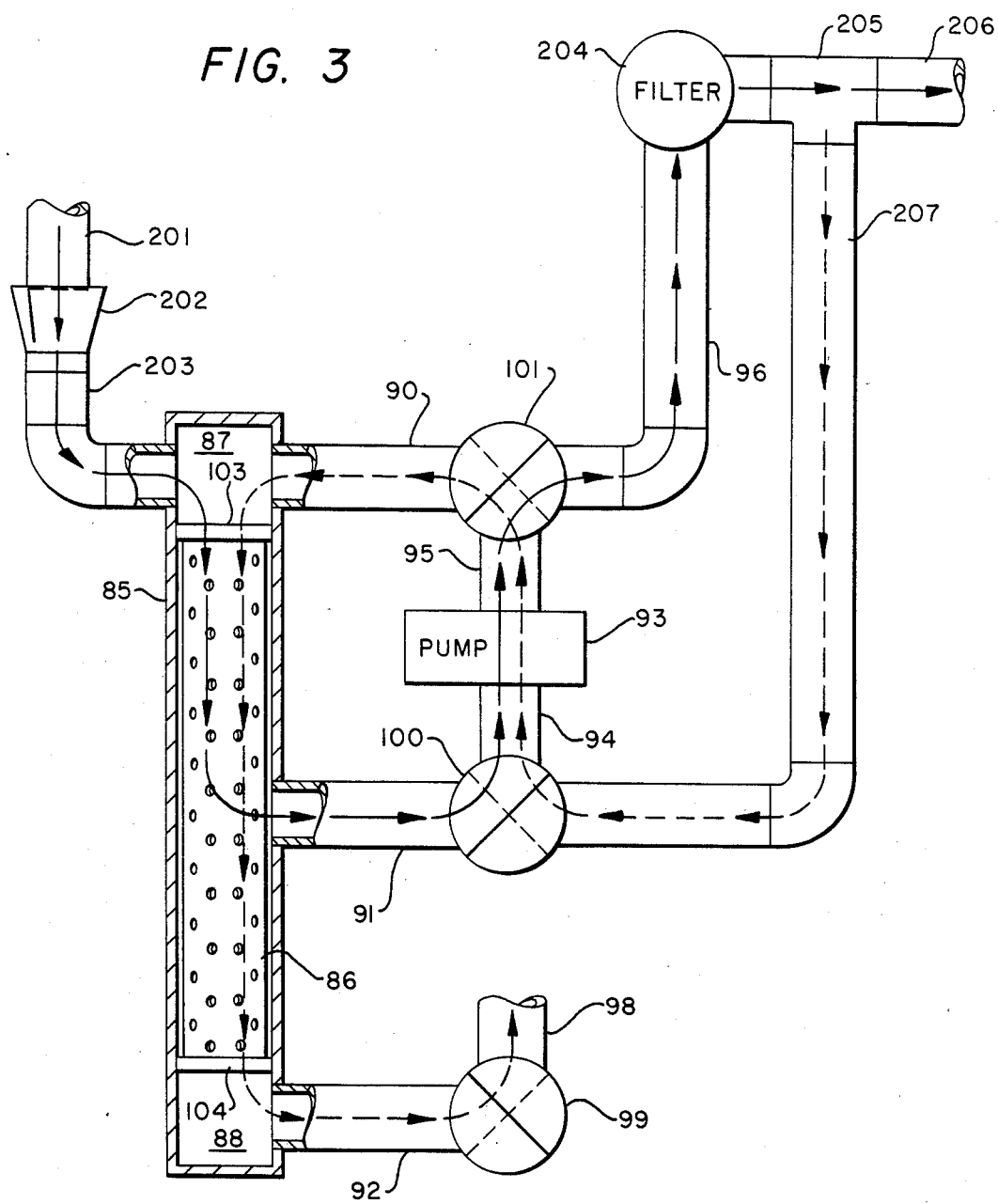

METHOD AND APPARATUS FOR CLEANING A PURGIBLE SWIMMING POOL STRAINER

RELATED APPLICATIONS

This application is a continuation-in-part application of U.S. patent application Ser. No. 477,378 filed Mar. 21, 1983.

BACKGROUND OF THE INVENTION

1. Field of the Invention

This invention relates to swimming pool water filtration systems and specifically to swimming pool water circulation systems including a strainer.

2. Description of the Prior Art

Swimming pool water circulation systems are provided to not only heat the water in a swimming pool but also to remove debris from the swimming pool. Most swimming pool water circulation systems include a strainer located between the pool recirculation system unfiltered untake and the pump. The strainer serves the purpose of protecting the pump from any large particles that may enter the system from the pool water circulation system unfiltered intake. The prior art method of cleaning strainers consist of removing the strainer from the system and physically removing the debris from the strainer. This technique has presented problems that result in the malfunction of the pool circulation system because of the loss of pump prime, air in the system, debris from the strainer entering the pump, or an imperfect seal when replacing the strainer.

The object of the present invention is to provide a system to alter the flow of water such that debris in the strainer may be removed by flushing water over the surface of the strainer to remove any debris connected thereon.

SUMMARY OF THE INVENTION

In accordance with the present invention an apparatus for circulating water in a swimming pool is disclosed that includes a strainer connected to a swimming pool unfiltered intake for retaining particles from a flow of water from the swimming pool unfiltered intake. A pump is connected to the strainer for pumping water from the strainer to a filter. The filter is positioned for removing sediment and finer particles from water received from the pump. A pool filtered return is connected to the filter for depositing water from the filter back into the swimming pool. The invention includes valve means that temporarily alters the flow of water from the swimming pool unfiltered intake to the pump and through the strainer to cause a flow of water across the strainer surface that removes the debris connected thereon and directs the water flow into a waste drain.

In a preferred embodiment of this invention the valve means includes a first valve that permits a flow of water from the swimming pool unfiltered intake to the strainer but prohibits a flow of water in the reverse direction. The valve means also includes the second valve which is connected to the filter, a discharge line of the pump, and the strainer and in first configuration connects the discharge line of the pump to the filter and in the second configuration connects the discharge of the pump to the strainer. A third valve is provided that is connected to the swimming pool unfiltered intake, the pump intake or suction and the strainer output. In the first configuration this third valve connects the strainer output to the pump intake and in the second configuration connects the pump intake to the swimming pool unfiltered intake. A fourth valve is included that in the second configuration connects the strainer to a waste drain or waste receptacle to receive debris removed from the surface of the strainer.

In a second preferred embodiment of this invention the valve configuration is similar to the first preferred embodiment except in the second configuration the third valve connects the pump intake to the filtered return flow to prevent unfiltered debris from entering the pump.

In a further preferred embodiment the second, third and fourth valves are configured in a stack arrangement permitting all three valves to be actuated by a single valve shaft.

One additional preferred embodiment includes a strainer apparatus for a swimming pool water circulating system that includes a strainer casing having a first area to receive incoming water and a second area for transmitting strained water and a third area for receiving water with debris from the strainer surface. The first and third areas are positioned to provide a water flow through the inside of the strainer in order to remove debris collected thereon, and the second area is positioned to receive strained water from the outside of the strainer surface. In addition, the strainer is provided that includes the outside and inside surface and is connected between two flanges at either end. The strainer is located in the casing such that the flanges isolate the first area and third area from the outside surface of the strainer and the second area. In a preferred embodiment the strainer is configured as a cylinder with the flanges located at either end.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 3 is a pictoral view of a second embodiment of the invention including a purge flow from the filtered pool return.

DETAILED DESCRIPTION OF THE PREFERRED EMBODIMENT

Figure 1:
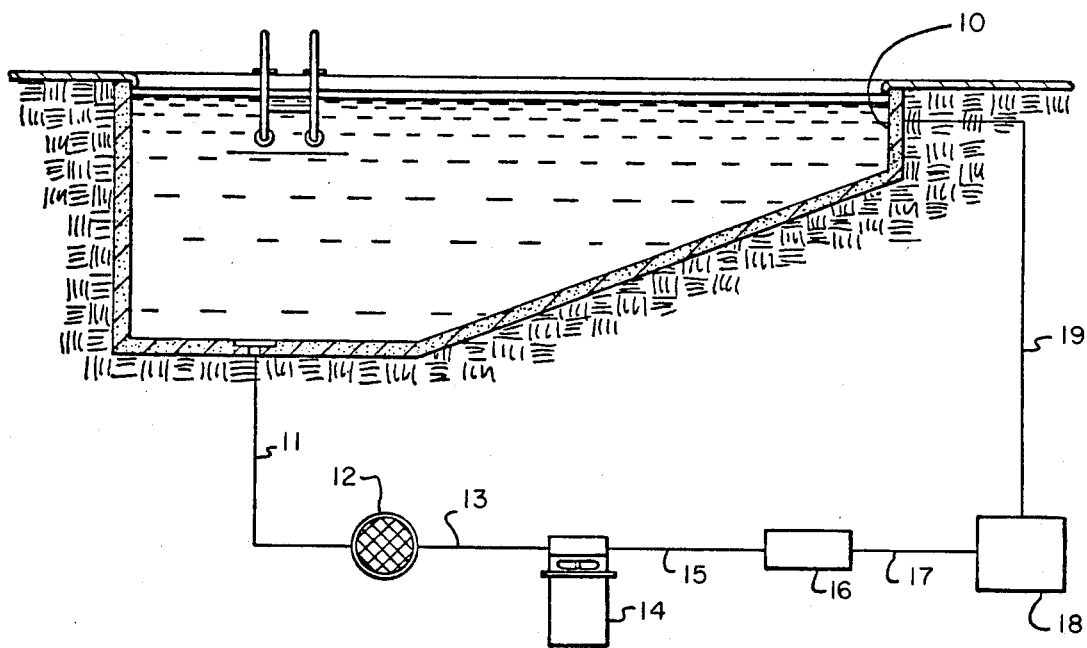
FIG. 1 is a schematic representation of a swimming pool water circulation system in the prior art.

Most modern swimming pool structures include a water circulation system. The water circulation system not only removes particles and debris from the water but may also heat the water and provide a means to introduce certain chemicals into the water. FIG. 1 illustrates a swimming pool circulation system as found in the prior art. The swimming pool 10 includes a drain pipe 11 that removes water from the swimming pool through an unfiltered intake. This water from the swimming pool unfiltered intake passes through a strainer 12 that removes large particles and protects the circulation pump 14. The pump 14 pumps water from the strainer 12 through pipe 13 to filter 16 through pipe 15 as shown. Filter 16 removes sediment and other particles not removed by the strainer 12. The water from the filter 16 passes through a pipe 17 to a heater element 18. The heater 18 may be a solar collector or a conventional combustion type heater. The heated water from the heater 18 passes back to the pool 10 through pipe 11 that is connected to the swimming pool filtered return. The water circulation system illustrated in FIG. 1 removes water from the bottom of the swimming pool 10 and strains, filters and heats the water and deposits the water back into the swimming pool 10 as shown. In this system both the filter 16 and the strainer 12 must be periodically cleaned to remove debris collected by each.

Figure 2:
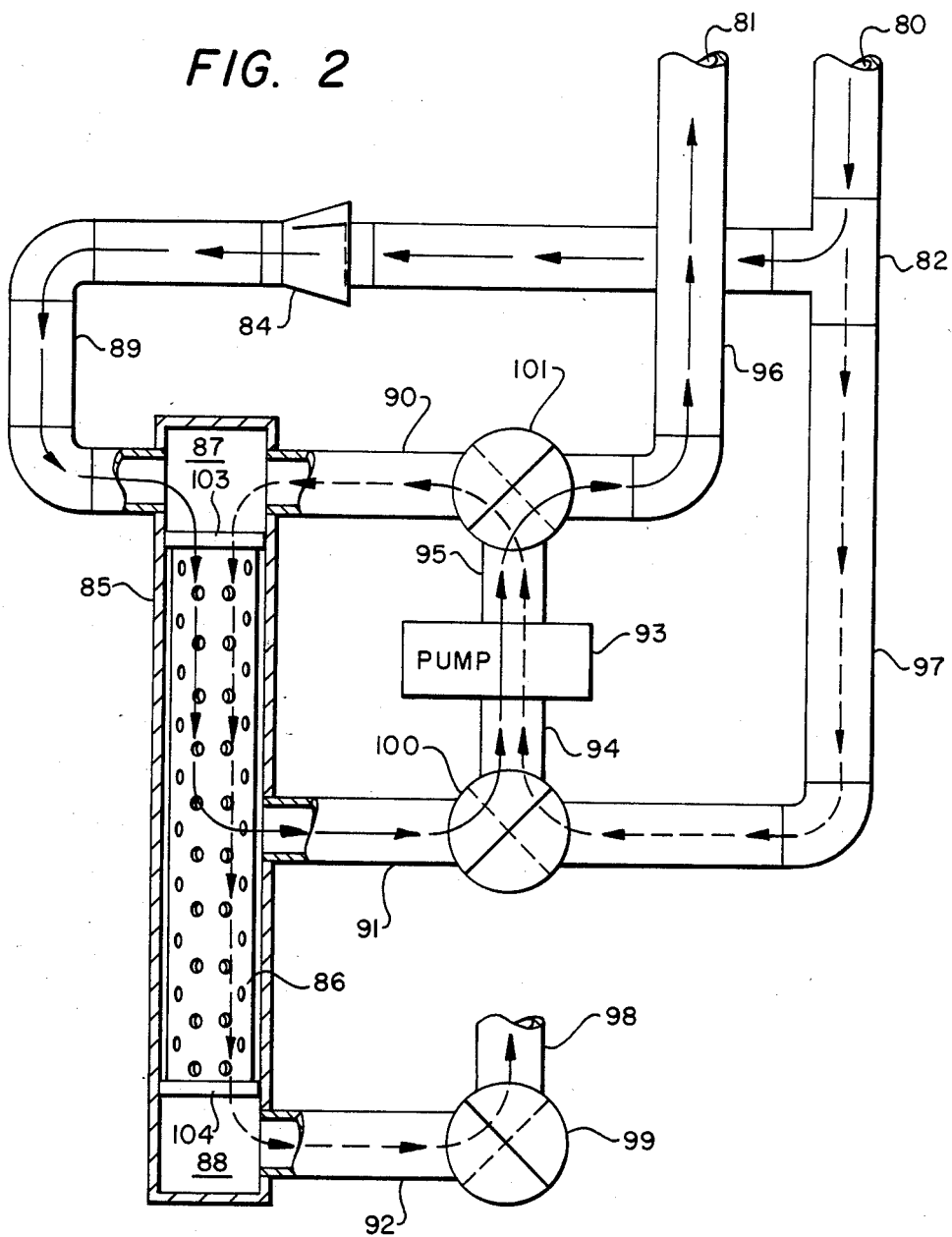
FIG. 2 is a pictorial view of an embodiment of the invention including three multi-port valves and one check valve.

The present invention addresses the problem of the removal of particles and debris from the strainer 12 in FIG. 1. One of the preferred embodiments of this invention is illustrated in FIG. 2. Pipe 80 is connected to the pool drain or pool unfiltered intake and provides the water from the swimming pool to the pipe tee 82 which is in turn connected to check valve 84 and pipe 89. Check valve 84 provides a flow of water from the pool tee 82 to the strainer 86 but prohibits the flow of water from the strainer 86 back to the tee 82 in the opposite direction. Pipe 89 is connected to the strainer housing 85 at area 87 as shown in FIG. 2. The strainer housing 85 contains the strainer 86 located below area 87 and above area 88. Area 87 is also connected to pipe 90 which is connected to the first valve 101. Valve 101 is a three port valve connecting pipe 90, pipe 96 and pipe 95. Pipe 96 is connected to the intake of th filter (not shown). Pipe 95 is connected to the pump 93 to receive the discharge or output from the pump 93. The pump 93 suction or input is connected to pipe 94 which is in turn connected to a second three port valve 100. Valve 100 is also connected to pipe 91 which in turn connects to the strainer housing 85 to receive strained water. Valve 100 further connects to pipe 97 which is connected to tee 82 and to the swimming pool unfiltered intake. The strainer housing 85 is further connected to pipe 92 at area 88. Pipe 92 is connected to a third multi-port valve 99 which is also connected to pipe 98. Pipe 98 leads to the waste discard drain.

The portion of the water circulation system shown in FIG. 2 operates in two configurations. The first configuration is the normal water flow configuration that provides water from the swimming pool unfiltered intake via pipe 80 to the filter (not shown) via pipe 96. The second configuration is a configuration to clean debris and waste material collected in the strainer 86.

In the first configuration water from the swimming pool intake or swimming pool drain flows in through pipe 80 to tee 82 through check valve 84 and pipe 89 to the strainer housing 85. The water enters the strainer housing 85 through area 87. The multi-port valve 101 is configured such that pipe 90 is not connected and thus the water flow is forced through the strainer 86. Likewise the multi-port valve 99 disconnects pipe 92 and isolates area 88. The flow of water then is forced through the strainer 86 to pipe 91 and through the multi-port valve 100 to pipe 94 which is connected to the pump 93 suction input. The pump 93 discharge is connected to pipe 95 which in turn is connected to multi-valve 101 and pipe 96. Pipe 96 is connected to the filter not shown. In this configuration water from the swimming pool intake is provided through strainer 86 to the pump 93 and to the filter in a manner that permits the strainer 86 to collect debris and thus protect the pump 93 (and its impeller) from damage caused by debris in the flow of water.

Periodically the strainer 86 must be cleaned to remove any collected debris. The cleaning of strainer 86 is accomplished by a change of valve configuration. It is important to note that the pump 93 does not change directions of water flow relative to itself, i.e. the flow of water is maintained from pipe 94 to pipe 95 in FIG. 2.

In the second configuration water from the swimming pool intake flows through pipe 80 through tee 82 to pipe 97 where it is connected through valve 100 to the suction or intake of the pump 93 via pipe 94. The water is pumped through pump 93 to pipe 95 which is connected to multi-valve 101 which has connected pipe 90 to the output of pump 93. The water then flows into chamber 87 of the strainer housing 85 through the strainer 86 into chamber 88 where it flows to the waste drain (not shown) through pipe 92, multi-port valve 99 and pipe 98. It should be noted that when the water flows into chamber 87 the water flow is prevented from flowing through pipe 89 back to tee 82 by the check valve 84. Also the flow of water through chamber 87 to chamber 88 is prevented from flowing on the outside of the strainer 86 by the strainer flanges 103 and 104 placed at opposite ends of strainer 86 which is formed as a cylinder. The flow of water through chamber 87 to chamber 88 thus removed collected debris on the inside surface of the strainer 86.

The valves 101, 100 and 99 are preferably configured in a stack arrangement permitting all three valves 101, 100 and 99 to be actuated with a single valve shaft.

A second preferred embodiment is illustrated in FIG. 3. This embodiment is similar to the embodiment of FIG. 2 with the exception that the unfiltered intake line 201 connects directly to a check valve 202 and through line 203 to the strainer housing 85. Also, a line 207 from the filtered return is connected to valve 100 to supply water during the purge cycle. This embodiment is advantageous because the water entering the pump 93 during the purge cycle is filtered and would not contain any debris that may damage the pump 93 impeller or hinder the operation of pump 93. Line 96 is shown connecting to the swimming pool filter 204 which connects to a tee 205. One side of the tee 205 connects to the line 206 to provide filtered water to the swimming pool return and the other side of the tee 205 is connected to line 207 to provide filtered water for the purge cycle.

Although preferred embodiments of the invention have been described in detail, it should be understood that various changes, alterations and substitutions may be made therein without departing from the spirit and scope of the invention as defined by the appended claims.

What is claimed is:

1. An apparatus for circulating water in a swimming pool comprising:
   a strainer connected through a valve means to a swimming pool intake for retaining particles from a flow of water from the swimming pool intake;
   a pump connected through the valve means to the strainer for pumping water;
   a filter for removing sediment from water received from the pump through the valve means;
   a swimming pool return connected to the filter for depositing water from the filter into the swimming pool; and
   the valve means for interconnecting said strainer, said pump, said filter, said swimming pool intake and said swimming pool return and for providing a first direction of water flow from the swimming pool intake through the strainer to the pump and to the filter and alternately providing a second direction of water flow from the swimming pool intake to the pump to the strainer to provide water flow substantially only across a single side of the strainer to remove particles retained thereon and to a waste receptacle wherein said water flow with removed particles are deposited.

2. An apparatus for circulating water in a swimming pool according to claim 1 wherein said valve means includes a first valve that permits a flow of water from the swimming pool intake to the strainer but prohibits a flow of water from the strainer to the swimming pool intake.

3. An apparatus for circulating water in a swimming pool according to claim 2 wherein said valve means includes a second valve connected to said filter, a discharge line of the pump and the strainer, said second valve in a first configuration providing a flow of water from the pump discharge to the filter in a second configuration providing a flow of water from the pump discharge to the strainer.

4. An apparatus for circulating water in a swimming pool according to claim 3 wherein said valve means includes a third valve that is connected to the swimming pool intake, a pump intake and a strainer output, said third valve including a first configuration for connecting the strainer output to the pump intake and a second configuration that connects the pump intake to the swimming pool intake.

5. An apparatus for circulating water in a swimming pool according to claim 1 wherein said valve means includes a fourth valve including a first configuration to prohibit a flow of water through the fourth valve and a second configuration to permit a flow of water to a waste receptacle, said flow of water containing debris removed from the surface of the strainer.

6. An apparatus for circulating water in a swimming pool according to claim 5 wherein said second, third, and fourth valves are connected and actuated by a single valve shaft.

7. An apparatus for circulating water in a swimming pool according to claim 3 wherein said valve means includes a third valve that is connected to the swimming pool filtered return, a pump intake and the strainer, said third valve including a first configuration for connecting the strainer to the pump intake and a second configuration that connects the pump intake to the swimming pool filtered return.

8. An apparatus for circulating water in a swimming pool according to claim 7 wherein said valve means includes a fourth valve connected to the strainer, said fourth valve including a first configuration for prohibiting a flow of water through the fourth valve and a second configuration to permit a flow of water to a waste receptacle, said flow of water containing debris removed from the surface of the strainer.

9. An apparatus for circulating water in a swimming pool according to claim 8 wherein said second, third, and fourth valves are connected and actuated by a single valve shaft.

* * * * *